United States Patent [19]

Bond et al.

[11] 4,280,543
[45] Jul. 28, 1981

[54] PNEUMATIC TIRES

[75] Inventors: Robert Bond, Lichfield; Arthur R. Williams, Birmingham, both of England

[73] Assignee: Dunlop Limited, London, England

[21] Appl. No.: 775,472

[22] Filed: Mar. 8, 1977

[30] Foreign Application Priority Data

Mar. 12, 1976 [GB] United Kingdom ............... 9935/76
Jul. 23, 1976 [GB] United Kingdom ............. 30745/76

[51] Int. Cl.³ .................. B60C 1/00; C08L 7/00; C08L 9/00
[52] U.S. Cl. ..................... 152/209 R; 152/357 R; 260/4 R; 525/216
[58] Field of Search ........... 152/357 A, 357 R, 354 R, 152/330 R, 209 R; 260/4 R, 888

[56] References Cited

U.S. PATENT DOCUMENTS

| | | | |
|---|---|---|---|
| 3,701,374 | 10/1972 | McGillvary | 152/357 A X |
| 3,919,130 | 11/1975 | Cohen | 260/4 R |
| 4,012,344 | 3/1977 | Cohen | 260/4 R |

FOREIGN PATENT DOCUMENTS

| | | |
|---|---|---|
| 1167677 | 4/1964 | Fed. Rep. of Germany . |
| 1295643 | 5/1962 | France . |
| 1375947 | 9/1964 | France . |
| 2274645 | 1/1976 | France . |
| 673962 | 6/1952 | United Kingdom . |
| 787068 | 11/1957 | United Kingdom . |

OTHER PUBLICATIONS

G. S. Whitby et al., *Synthetic Rubber*, 1954, p. 331.

*Primary Examiner*—Randolph A. Reese
*Attorney, Agent, or Firm*—Stevens, Davis, Miller & Mosher

[57] ABSTRACT

A tire having a tread with improved wet grip characteristics. The tread is made from a composition which has specific loss factor values measured in high and low frequency ranges defined herein.

2 Claims, 5 Drawing Figures

PNEUMATIC TIRES

This invention relates to pneumatic tires, particularly to pneumatic tires having a tread portion and a pair of sidewalls, the sidewalls terminating in beads to be seated on a rigid wheel rim.

A great deal of work has been carried out by the tire industry in developing pneumatic tires for vehicle wheels which will have a good grip on both dry surfaces and wet surfaces, the latter presenting a greater problem since water is a well-known lubricant for rubber.

Over the past two decades synthetic rubbery polymers have been produced and these have led to the development of high cling rubbers which give very good grip on wet surfaces. However, it has been thought that the wet grip of a particular rubber compound is dependent upon the hysteresis characteristics of the rubber in that high hysteresis compounds give the best grip under wet conditions (see U.K. Pat. No. 837,849).

By high hysteresis, is meant compounds having a rebound resilience (as measured by the Dunlop Pendulum method according to British Standard B.S. 903: Part 22: 1950) of not more than 40% at 50° C.

It will be appreciated that in the dynamic conditions undergone by a normal pneumatic tire, high hysteresis tends to be undesirable because the energy loss in the rubber is converted into heat which will cause the tire to over-heat if a rubber of too high a hysteresis is used in a particular application.

For this reason high hysteresis rubbers such as styrene butadiene rubber, which are advantageous when used in tread compositions for their good wet grip, are used in pneumatic tires only when the heat build-up in the rubber can be tolerated without damage to the tire. Large amounts of low hysteresis rubber have to be used in pneumatic tires such as truck tires and earthmover tires where the thickness of rubber is greatest and which are most prone to failures through heat generation. The compounds presently available giving the highest wet grip, i.e. as used in wet weather car racing tires, cannot be used in, e.g. truck tires and earthmover tires, on a dry road without overheating.

We have now found that is it possible to isolate the characteristics of a rubber compound necessary to give improved wet grip from the characteristics which will lead to high heat generation in normal rotation of the tire.

According to the present invention there is provided a pneumatic tire having a tread, sidewalls and beads for seating on a rigid wheel rim; at least part of the tread of said tire comprising polymeric material having a loss factor less than or equal to 0.35 in the frequency range 1.5–150 Hz at temperatures between 20° C. and 150° C. and under a strain of 1%; while in the frequency range 40 kHz–1000 kHz at temperatures between 50° C. and 150° C. and deformation levels of 10 to $100 \times 10^{-3}$ mm and taking a graph of loss factor against $\log_{10}$ of the frequency, the area on the graph between these frequency limits above the line loss factor=0.012 divided by the total area below the line loss factor=0.012 is greater than or equal to 3.4.

Preferably the polymeric material has a loss factor less than or equal to 0.20 in the frequency range 1.5–150 Hz at temperatures between 20° C. and 150° C. and under a strain of 1%.

According to another aspect of the invention there is provided a pneumatic tire having a tread, sidewalls and beads for seating on a rigid wheel rim; at least part of the tread of said tire comprising polymeric material having a loss factor less than or equal to 0.2 in the frequency range 1.5–150 Hz at temperatures between 20° C. and 150° C. and under a strain of 1%; while in the frequency range 40 kHz–1000 kHz at temperatures between 20° C. and 150° C. and deformation levels of $10–100 \times 10^{-3}$ mm and taking a graph of loss factor against $\log_{10}$ of the frequency, the area on the graph between these frequency limits above the line loss factor=0.1 divided by the total area below the line loss factor=0.1 is greater than or equal to 1.2.

In this specification the loss factor is the ratio of the energy absorbed per cycle of deformation into the polymeric material of the tread to $2\pi$ times the maximum stored energy.

It has been found that the frequency of deformation of a pneumatic tire under normal rolling conditions is in the lower frequency range 1.5–150 Hz, whereas at the tire to road surface interface during braking under locked wheel conditions, the deformations of the tire tread surfaces are in the frequency range 40 kHz–1000 kHz owing to the surface texture of the road. For this reason, it is believed that it is possible to produce a tire having an acceptably low hysteresis loss in its tread under normal rolling conditions yet having a high wet grip owing to the specified relatively greater hysteresis loss of the tread under the high frequency conditions.

In order to describe the present invention more fully, this specification is accompanied by drawings of which:

Figure 1:
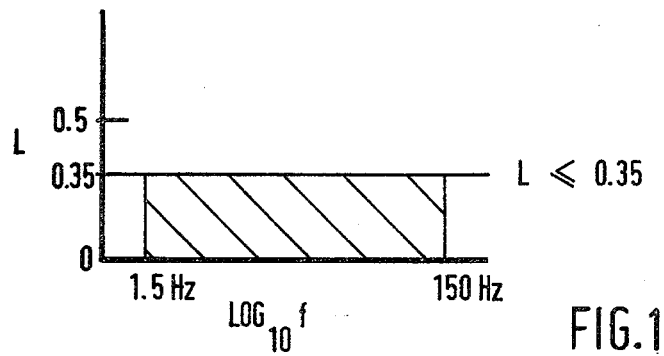
FIG. 1 shows a graph of loss factor (L) against $\log_{10}$ of the frequency (f) in the lower frequency range referred to above.

In the graph shown in FIG. 1 the area bounded by the lines loss factors L=0.35 and 0, and lines frequencies f=1.5 Hz and 150 Hz is hatched. A polymeric material in the tread of a tire according to the invention would have loss factor values falling within this area.

Figure 2:
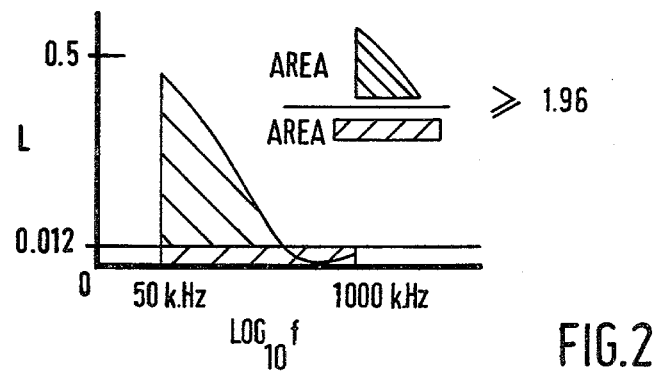
FIG. 2 shows a graph of loss factor (L) against $\log_{10}$ of the frequency (f) in the higher frequency range referred to above.

In the graph shown in FIG. 2 the area bounded by the graph of loss factor (L) against $\log_{10}$ frequency (f), the line f=50 kHz and the line loss factor L=0.012, which is an approximately triangular area, is hatched. The rectangular area bounded by the lines loss factor L=0 and 0.012, and the lines frequency f=50 kHz and 1000 kHz is also hatched. A tire in accordance with the present invention has a tread of a polymeric composition having loss factor values such that the ratio of the approximately triangular area to the rectangular area is greater than or equal to 3.4.

Figure 3:
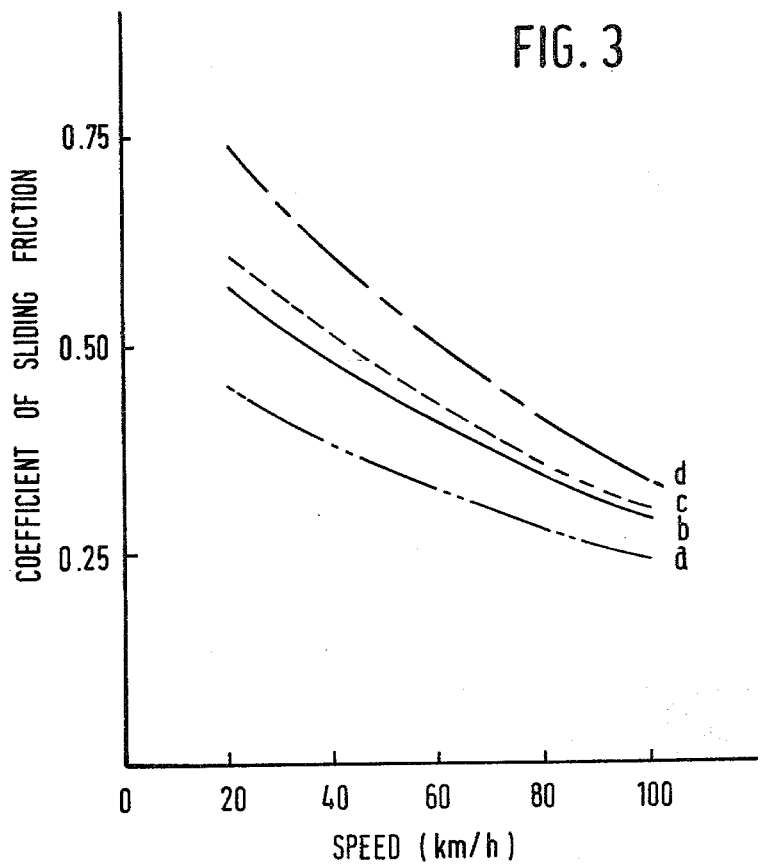
FIG. 3 shows graphs of coefficient of sliding friction under wet conditions against speed for four tires having treads of different polymeric materials.
Figure 4:
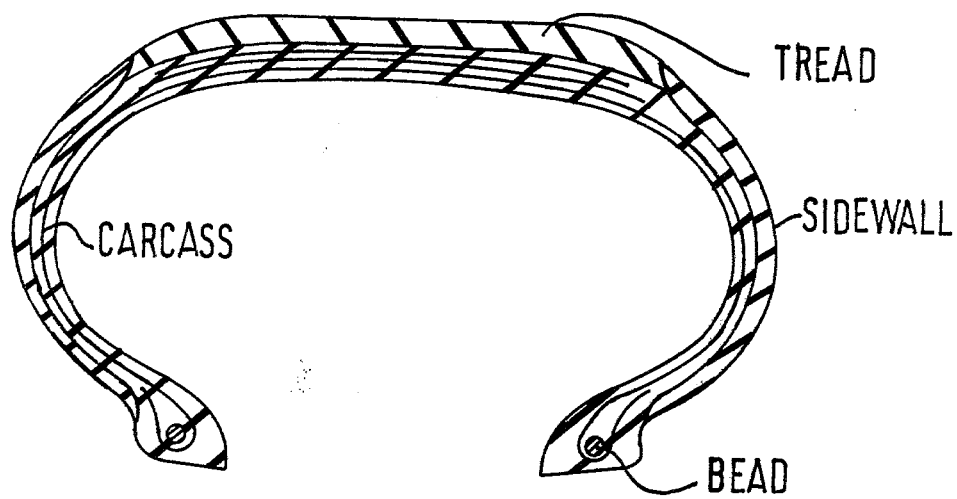
FIG. 4 is a cross-sectional view of a tire according to the present invention wherein the entire tread portion is composed of the polymeric material defined by the claims.
Figure 5:
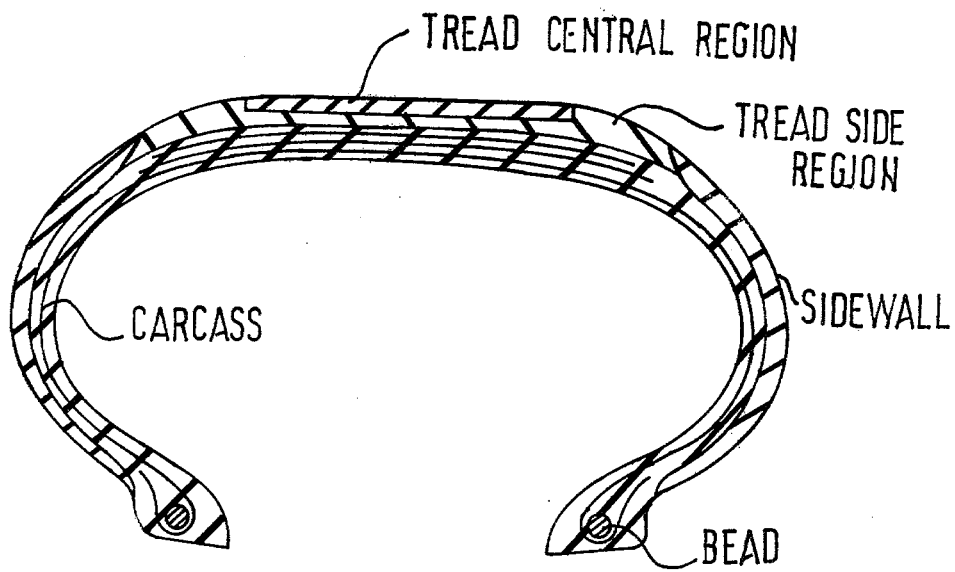
FIG. 5 is a cross-sectional view of a tire in another embodiment of applicants' invention wherein only the tread central region is composed of the polymeric material defined by the claims.

Four tires having plain treads of compositions a, b, c and d were made and tested in order to measure the coefficient of sliding friction under wet, locked wheel conditions with respect to the same surface over a range of speeds. The results obtained are shown in FIG. 3 and it can be seen that compound d has a higher coefficient of friction, and, in other words, improved wet grip properties, compared with compounds a, b and c.

Compound c is a typical truck tire tread compound and compounds a and b are tread compounds compatible with compound d but based wholly on natural rubber.

Details of the composition and curing conditions, and some physical properties of the compounds a, b, c and d are given below:

| Composition (a, b and d) | Compound a | b (parts) | d |
|---|---|---|---|
| Natural rubber | 100 | 100 | 50 |
| Polyisobutylene | — | — | 50 |
| *Santocure (N-cyclohexyl-2-benzthiazyl sulphenamide) | 0.5 | 0.5 | 0.5 |
| Stearic acid | 2.0 | 2.0 | 1.0 |
| Zinc oxide | 5.0 | 5.0 | 5.0 |
| Mineral oil | 5.0 | 5.0 | 5.0 |
| *Nonox ZA (N-isopropyl-N'-phenyl-paraphenylene diamine) | 0.15 | 0.15 | 0.08 |
| *Nonox BLB (50/50 condensation product of acetone and diphenylamine/carbon black) | 1.70 | 1.70 | 0.85 |
| N110 Carbon Black | — | — | 12.5 |
| N660 Carbon Black | 25.0 | 75.0 | 37.5 |
| Sulphur | 2.5 | 2.5 | 2.5 |
| *Trade Marks | | | |

Curing conditions (a, b and d)
50 minutes at 135° C.

| Composition (c) | Parts |
|---|---|
| Natural rubber | 80.0 |
| Synthetic cis-polyisoprene | 20.0 |
| *Santocure MOR (N'-oxydiethylene benzthiazyl sulphenamide) | 0.7 |
| PVI-50 (50% mixture of cyclohexylthio-phthalimide and an inert filler) | 0.4 |
| Stearic acid | 2.0 |
| Zinc oxide | 4.0 |
| *Dutrex RT (Aromatic oil with a tackifier of magnesium naphthenate added) | 6.0 |
| *Arrconox GP(75/25 mixture of an aldehyde/amine condensate product absorbed on an inert filler) | 2.0 |
| IPPD (N'N"-isopropyl phenyl paraphenylene-diamine) | 0.5 |
| Paraffin wax | 1.0 |
| N375 carbon black | 52.5 |
| 40 mesh crumb | 5.0 |
| Soluble sulphur | 2.5 |
| *Trade Marks | |

Curing conditions (c)
15/40 minutes at 140° C.

| Physical properties | a | b | d |
|---|---|---|---|
| Tensile strength | 27.1 MN/m² | 25.2 MN/m² | 12.1 MN/m² |
| Modulus Elongation 100% | 1.6 MN/m² | 4.2 MN/m² | 1.8 MN/m² |
| 200% | 3.6 MN/m² | 10.7 MN/m² | 4.7 MN/m² |
| 300% | 6.6 MN/m² | 16.2 MN/m² | 8.3 MN/m² |
| Breaking elongation | 667% | 363% | 407% |
| Tear strength 20° C. (measured on ASTM standard test piece) | 256 | 217 | 152 |
| 100° C. | 99 | 214 | 113 |
| Hardness (BS(micro/measured on a Dunlop Tripsometer) | 50.0 | 66.3 | 42.0 |
| Resilience (measured at 50° C. on a Dunlop Tripsometer) | 87.0% | 70.2% | 51.0% |

| Loss factor (compound d) Vibration frequency at which measurement was made (f) | Loss factor (L) | Temperature |
|---|---|---|
| 1.5 Hz* | 0.246 | 24° C. |
| 15 Hz* | 0.267 | 24° C. |
| 150 Hz* | 0.349 | 24° C. |
| 50 kHz** | 0.2169 | 100° C. |
| 100 kHz** | 0.0040 | 100° C. |
| 300 kHz** | 0.0018 | 100° C. |
| 600 kHz** | negligibly small | 100° C. |
| 1000 kHz** | negligibly small | 100° C. |

Ratio of areas at high frequencies on graph as in FIG. 2 = 1.97
Hardness (compound c) IRHD 69
resilience (compound c) (measured on a Dunlop Pendulum at 50° C.) 69

*Under a strain of 1%
**Deformation between $10 \times 10^{-3}$ mm and $100 \times 10^{-3}$ mm Power loss (compound c) measured on Power Loss machine

| | Elastic Modulus (E') | Loss Modulus (E") | $\frac{E''}{E'}$ (loss factor) |
|---|---|---|---|
| 50° C. | 5.38 MN/m² | 0.50 MN/m² | 0.093 |
| 80° C. | 5.03 MN/m² | 0.41 MN/m² | 0.082 |
| 100° C. | 4.87 MN/m² | 0.41 MN/m² | 0.085 |

Thus the tire in accordance with the present invention i.e. having a tread of compound d, has improved wet grip properties compared with the other tires tested which are not in accordance with the present invention as is evident from a comparison of their properties as set forth above and in Table I and Table II below which set forth loss factors for compounds a, b and d over both the high and low frequency ranges.

TABLE I

HIGH FREQUENCY RESULTS (40KHz to 1000KHz)

| Freq. (KHz) | Loss Factor | Temp. |
|---|---|---|
| Compound a | | |
| 50 | 0.033 | 100° C. |
| 115 | 0.006 | 100° C. |
| 300 | 0.009 | 100° C. |
| 600 | 0.005 | 100° C. |
| 1000 | negligible (−0.003) | 100° C. |
| Compound b | | |
| 52 | 0.163 | 100° C. |
| 121 | negligible (−0.025) | 100° C. |
| 300 | negligible (−0.000) | 100° C. |
| 600 | negligible (−0.007) | 100° C. |
| 1005 | negligible (−0.007) | 100° C. |
| Compound d | | |
| 50 | 0.217 | 100° C. |
| 100 | 0.004 | 100° C. |
| 300 | 0.002 | 100° C. |
| 600 | 0.007 | 100° C. |
| 1000 | 0.002 | 100° C. |

TABLE II

LOW FREQUENCY RESULTS. (1.5 to 150Hz)

| Compound × Temperature | Frequency (Hz) | Loss Factor |
|---|---|---|
| Compound a | | |
| 19° C. | 1.5 | 0.071 |
| | 15.0 | 0.092 |
| | 150.0 | 0.162 |
| 55° C. | 1.5 | 0.062 |
| | 15.0 | 0.071 |

TABLE II-continued

LOW FREQUENCY RESULTS.
(1.5 to 150Hz)

| Compound × Temperature | Frequency (Hz) | Loss Factor |
|---|---|---|
| | 150.0 | 0.112 |
| 106° C. | 1.5 | 0.044 |
| | 15.0 | 0.058 |
| | 150.0 | 0.100 |
| Compound b | | |
| 21° C. | 1.5 | 0.083 |
| | 15.0 | 0.094 |
| | 150.0 | 0.147 |
| 51° C. | 1.5 | 0.073 |
| | 15.0 | 0.072 |
| | 150.0 | 0.107 |
| 105° C. | 1.5 | 0.039 |
| | 15.0 | 0.058 |
| | 150.0 | 0.080 |
| Compound d | | |
| 24° C. | 1.5 | 0.246 |
| | 15.0 | 0.267 |
| | 150.0 | 0.349 |
| 48° C. | 1.5 | 0.190 |
| | 15.0 | 0.218 |
| | 150.0 | 0.247 |
| 101° C. | 1.5 | 0.117 |
| | 15.0 | 0.137 |
| | 150.0 | 0.169 |

Having now described our invention, what we claim is:

1. A pneumatic tire having a tread, sidewalls and beads for seating on a rigid wheel rim; at least part of the tread of said tire comprising a cured compound having a loss factor less than or equal to 0.35 when deformed cyclically in the frequency range 1.5–150 Hz at a temperature of 24° C. and under a strain of 1%, whilst when deformed cyclically in the frequency range 50 kHz–1000 kHz at a temperature of 100° C. and deformation levels of 10 to $100 \times 10^{-3}$ mm and taking a graph of loss factor against $\log_{10}$ of the frequency, the area of the graph between these frequency limits above the line loss factor=0.012 divided by the total area below the line loss factor=0.012 is greater than or equal to 1.96.

2. A pneumatic tire having a tread composition cured at 135° C. for 50 minutes comprising 50 parts natural rubber, 50 parts polyisobutylene, 0.5 parts N-cyclohexyl-2-benzthiazyl sulphenamide, 1.0 parts stearic acid, 5.0 parts zinc oxide, 5.0 parts mineral oil, 0.08 parts N-isopropyl-N'-phenyl-paraphenylene diamine, 0.85 parts 50/50 condensation product of acetone and diphenylamine/carbon black, 12.5 parts N110 carbon black, 37.5 parts N660 carbon black, and 2.5 parts sulphur.

* * * * *